(12) United States Patent
Hokkanen et al.

(10) Patent No.: US 10,968,601 B2
(45) Date of Patent: Apr. 6, 2021

(54) CONTROLLING EARTHMOVING MACHINE

(71) Applicant: Novatron Oy, Pirkkala (FI)

(72) Inventors: Visa Hokkanen, Tampere (FI); Petri Moisio, Tampere (FI)

(73) Assignee: Novatron Oy, Pirkkala (FI)

( * ) Notice: Subject to any disclaimer, the term of this patent is extended or adjusted under 35 U.S.C. 154(b) by 156 days.

(21) Appl. No.: 16/172,784

(22) Filed: Oct. 27, 2018

(65) Prior Publication Data
US 2019/0161939 A1    May 30, 2019

(30) Foreign Application Priority Data

Nov. 24, 2017  (FI) ..................... 20176052
Jul. 12, 2018  (FI) ..................... 20180082

(51) Int. Cl.
| | | |
|---|---|---|
| *E02F 9/20* | (2006.01) | |
| *E02F 9/26* | (2006.01) | |
| *E02F 3/43* | (2006.01) | |
| *E02F 3/84* | (2006.01) | |
| *E02F 9/22* | (2006.01) | |
| *E02F 3/14* | (2006.01) | |

(52) U.S. Cl.
CPC .............. *E02F 9/205* (2013.01); *E02F 3/143* (2013.01); *E02F 3/845* (2013.01); *E02F 9/20* (2013.01); *E02F 9/2012* (2013.01); *E02F 9/2041* (2013.01); *E02F 9/2045* (2013.01); *E02F 9/26* (2013.01); *E02F 9/262* (2013.01); *E02F 9/265* (2013.01); *E02F 9/2004* (2013.01); *E02F 9/2267* (2013.01)

(58) Field of Classification Search
CPC ... E02F 9/205; E02F 3/43; E02F 3/845; E02F 9/20; E02F 9/2012; E02F 9/2041
See application file for complete search history.

(56) References Cited

U.S. PATENT DOCUMENTS

| | | | |
|---|---|---|---|
| 7,441,404 B2 | 10/2008 | Devier et al. | |
| 9,790,695 B1 | 10/2017 | Friend et al. | |
| (Continued) | | | |

FOREIGN PATENT DOCUMENTS

| | | | |
|---|---|---|---|
| CN | 1782443 A | 6/2006 | |
| CN | 101432529 A | 5/2009 | |
| (Continued) | | | |

OTHER PUBLICATIONS

Search Report for Finland Patent Application Serial No. 20180081 dated Nov. 23, 2018, 1 page.
(Continued)

*Primary Examiner* — Michael D Lang
(74) *Attorney, Agent, or Firm* — FisherBroyles, LLP

(57) ABSTRACT

A BEIM (Built Environment Information Model)-based control system (CS) for controlling an earthmoving machine (E) is disclosed. The control system includes at least one controller (CO) for controlling at least one movement of an earthmoving tool (3) attached to the earthmoving machine, at least one control unit (CU), and sensing means (11, 12) for providing the control unit with position data of the earthmoving tool and a carrier (1) of the earthmoving machine with respect to the BEIM. The control system also includes at least one displaying means for displaying at least one BEIM selectable by the at least one controller.

An earthmoving machine and a method for controlling an earthmoving machine are also disclosed.

17 Claims, 3 Drawing Sheets

(56) References Cited

U.S. PATENT DOCUMENTS

| | | |
|---|---|---|
| 2002/0152027 A1 | 10/2002 | Allen |
| 2003/0161906 A1 | 8/2003 | Braunhardt et al. |
| 2004/0030919 A1 | 2/2004 | Moriya et al. |
| 2006/0271263 A1 | 11/2006 | Self et al. |
| 2008/0254417 A1 | 10/2008 | Mohamed |
| 2011/0137491 A1 | 6/2011 | Self et al. |
| 2011/0178677 A1 | 7/2011 | Finley et al. |
| 2012/0136524 A1 | 5/2012 | Everett et al. |
| 2012/0174445 A1 | 7/2012 | Jones et al. |
| 2012/0263566 A1 | 10/2012 | Taylor et al. |
| 2013/0006484 A1 | 1/2013 | Avitzur et al. |
| 2013/0311153 A1 | 11/2013 | Moughler et al. |
| 2014/0172128 A1 | 6/2014 | Johnson et al. |
| 2015/0004573 A1 | 1/2015 | Bomer et al. |
| 2016/0205864 A1 | 7/2016 | Gattis et al. |
| 2017/0089032 A1 | 3/2017 | Hokkanen et al. |
| 2017/0292248 A1 | 10/2017 | Matson et al. |
| 2017/0336630 A1 | 11/2017 | Cummings et al. |
| 2019/0161941 A1 | 5/2019 | Hokkanen et al. |
| 2019/0161942 A1 | 5/2019 | Hokkanen et al. |

FOREIGN PATENT DOCUMENTS

| | | |
|---|---|---|
| CN | 102770604 A | 11/2012 |
| CN | 202644604 U | 1/2013 |
| CN | 106715800 A | 5/2017 |
| CN | 109837941 A | 6/2019 |
| DE | 10 2005 049 550 A1 | 6/2006 |
| DE | 10 2013 113 801 A1 | 6/2015 |
| DE | 102016004266 A1 | 10/2017 |
| EP | 1004230 A2 | 5/2000 |
| EP | 1 883 871 A2 | 2/2008 |
| EP | 3 489 421 A2 | 5/2019 |
| EP | 3 489 422 A2 | 5/2019 |
| EP | 3 489 423 A2 | 5/2019 |
| GB | 2 342 640 A | 4/2000 |
| JP | H01-127731 A | 5/1989 |
| JP | 2003082701 A | 3/2003 |
| KR | 10-1695914 B1 | 1/2017 |
| WO | 00/43866 A1 | 7/2000 |
| WO | 2006/130497 A2 | 12/2006 |
| WO | 2017/176773 A1 | 10/2017 |

OTHER PUBLICATIONS

Office Action received for Finland Patent Application Serial No. 20180081 dated Nov. 23, 2018, 6 pages.

Partial European Search Report received for EP Patent Application Serial No. EP18207450.0 dated Apr. 2, 2019, 15 pages.

Partial European Search Report received for EP Patent Application Serial No. 18207447.6 dated Apr. 2, 2019, 17 pages.

Office Action received for Finland Patent Application Serial No. 20180082 dated May 7, 2019, 6 pages.

Partial Search report issued by the European Patent Office in relation to corresponding EP Application No. EP 18207452.6 dated Apr. 2, 2019, 16 pages.

Search Report for Finnish Patent Application No. 20180082 dated Dec. 13, 2018.

Office Action from the Finnish Patent and Registration Office for Patent Application No. 20176052, dated May 9, 2018.

First Office Action received in Chinese Patent Application Serial No. 201811387402.6 dated Oct. 16, 2020, 8 pages.

First Office Action received for Chinese Patent Application Serial No. 201811387401.1 dated Oct. 16, 2020, 20 pages. (Including English Translation).

//CONTROLLING EARTHMOVING MACHINE

CROSS-REFERENCE TO RELATED APPLICATION

This application claims the benefit of Finnish Patent Application No. 20176052, filed on Nov. 24, 2017, and Finnish Patent Application No. 20180082, filed on Jul. 12, 2018, the disclosures of which are incorporated by reference herein in their entireties.

BACKGROUND

Field

The invention relates to a control system, an apparatus, a computer program product and a computer program embodied on a non-transitory computer readable storage medium for controlling an earthmoving machine.

Description of the Related Art

Different types of earthmoving machines may be utilized at different work sites for moving soil or rock material to another location or to process them into a desired shape. Earthmoving machines are used in excavation work and road construction, for example. Earthmoving machines have user interfaces containing multiple controllers and multiple displaying means for an operator to interact with the earthmoving machine.

SUMMARY

An object of the present invention is to provide a novel and improved control system for an earthmoving machine. Further object is to provide a novel and improved earthmoving machine equipped with the control system.

The objects of the invention are achieved by what is stated in the independent claims. Some embodiments of the invention are disclosed in the dependent claims.

The invention is based on the idea of controlling operations of an earthmoving machine by a BEIM (Built Environment Information Model)-based control system. The BEIM-based control system comprises at least one controller for controlling at Least one movement of an earthmoving tool attached to the earthmoving machine, at least one control unit, and sensing means for providing the control unit with position data of the earthmoving tool and a carrier of the earthmoving machine with respect to the BEIM. The BEIM-based control system further comprises at least one displaying means for displaying at least one BEIM selectable by the at least one controller. Further the at least one control unit is configured to receive at least one selection from the at least one controller for selecting the BEIM to work with, and receive at least one work command regarding the BEIM selected. A progress of the work regarding the work command received is monitored, and based at least in part on the monitoring the work command received is carried out or interrupted by the at least one control unit. Furthermore, the at least one controller is operable both attached and detached.

An advantage of the control system of the invention is that automatic or semiautomatic controls of the earthmoving machine may be provided by earthmoving information models including an intended planned final result of an earthwork to be completed as well as operations to be carried out by the earthmoving machine so as to achieve the planned final result of the earthwork.

According to an embodiment of the control system, the BEIM-based earthmoving information model comprises an earthmoving information model based on at least one of Geospatial Information System (GIS), Building Information Modelling (BIM), Infra or Infrastructure Building Information Modelling (I-BIM), Civil Information Model (CIM) and SmartCity Platform.

According to an embodiment of the control system, the BEIM comprises a number of missions, each mission comprising a number of tasks, at least one of the number of missions and the at least one of the number of tasks comprising at least one work command to be carried out by the earthmoving machine.

According to an embodiment of the control system, the control unit is configured to retrieve the at least one BEIM from a cloud service or Internet.

According to an embodiment of the control system, the control unit is configured to monitor at least one of load and stress of at least one of the earthmoving tool and the earthmoving machine and interrupt the work command when the at least one of load and stress exceeding a predetermined threshold parameter.

According to an embodiment of the control system, the control system further comprises means for determining the location of the at least one controller with respect to the earthmoving machine and the operation mode of the at least one controller depends on the location of the at least one controller. An advantage of this embodiment is that any possible collision between the earthmoving machine and/or the earthmoving tool and the operator remaining outside a control cabin of the earthmoving machine may be avoided.

According to an embodiment of the control system, the operation mode of the at least one controller depends on whether each of the at least one controller is attached or detached.

According to an embodiment of the control system, the control system comprises one to four controllers and at least one displaying means for displaying controls selectable and controllable by the one to four controllers, and that the at least one control unit is configured to receive selections and controls from the one to four controllers for controlling all the operations of the earthmoving machine controllable by the one to four controllers, the one to four controllers are operable both attached and detached, and the control system further comprises means for determining the location of the at least one controller with respect to the earthmoving machine. An advantage of this embodiment is that the operator of the earthmoving machine may customize the way for controlling the operations of the earthmoving machine with the one to four controllers according to his or her own desires. Another advantage is that the operator need not to reach out any other buttons or switches in any case if desired.

According to an embodiment of the control system, the operation mode of the at least one controller, when detached, depends on the distance between the controller and the earthmoving machine.

According to an embodiment of the control system, the operation mode of the at least one controller, when detached, depends on the distance between the controller and the earthmoving tool of the earthmoving machine.

According to an embodiment of the control system, the operation mode of the at least one controller, when detached, depends on the distance to the at least one other controller.

According to an embodiment of the control system, the operation mode of the at least one controller depends on the distance between a detected obstacle and at least one of the earthmoving tool and the earthmoving machine.

According to an embodiment of the control system, the operation mode of the at least one controller depends on the user specified adjustments made by or made for the user currently logged in to the control system.

According to an embodiment of the control system, the extent of the available adjustments depends on the skill level data of the user currently logged in, the skill level data being defined by at least one of: usage hours of the earthmoving machine, usage hours of the respective earthmoving machine, competence level accomplished or passed by an examination or test.

According to an embodiment of the control system, the operation mode of the at least one controller depends on the user specified adjustments made by or made for the user currently logged in to the control system, wherein the extent of the available adjustments depends on the skill level data of the user currently logged in, the skill level data being defined by at least one of: usage hours of the earthmoving machine, usage hours of the respective earthmoving machine and competence level being at least one of accomplished and passed by at least one of an examination and a test.

According to an embodiment of the control system, the operation of the earthmoving machine controllable by the at least one controller is at least one of: driving system, peripheral device, maintenance system, road navigation system, work site navigation system, positioning the earthmoving tool with respect to the work site, weighing system, automation system, measuring system and process control.

According to an embodiment of the control system, the control system gives feedback by at least one of the following signals: graphical, augmented reality, virtual reality, audiovisual, visual illumination, haptics and force-feedback.

According to an embodiment of the control system, the user with administrator privileges define the skill level by editing the skill level data of the user.

According to an embodiment of the control system, the user with administrator privileges define the skill level by editing the skill level data of the user in a cloud service and the earthmoving machine retrieves the data from the cloud service.

According to an embodiment of the control system, the at least one control unit is configured to receive selections and controls from the at least one controller for controlling at least the tool and the driving of the earthmoving machine.

According to an embodiment of the control system, the at least one control unit is configured to receive selections and controls from the at least one controller for controlling at least moving the earthmoving tool in relation to the carrier and driving the earthmoving machine.

According to an embodiment of the control system, the at least one control unit is configured to receive selections and controls from the at least one controller for controlling all the operations of the earthmoving machine controllable by the operator of the earthmoving machine.

According to an embodiment of the control system, the amount of controllers is two.

According to an embodiment of the earthmoving machine, the earthmoving machine comprises a movable carrier, at least one earthmoving tool that is movable in relation to the carrier, peripheral devices, actuating means for moving the earthmoving tool in relation to the carrier and means for controlling the peripheral devices, and at least one BEIM (Built Environment Information Model)-based control system as claimed in any one of claims 1 to 14.

According to an embodiment of the earthmoving machine, the earthmoving machine is one of the following: excavator, bulldozer, motor grader, compaction machine, piling machine, deep stabilization machine, surface top drilling machine.

According to an embodiment of a method for controlling an earthmoving machine, the method comprises controlling the earthmoving machine with BEIM (Built Environment Information Model)-based control system comprising at least one controller for controlling movements of an earthmoving tool attached to the earthmoving machine, at least one control unit, sensing means for providing the control unit with position data of the tool and a carrier of the earthmoving machine, and at least one displaying means for displaying at least one BEIM selectable by the at least one controller, and wherein the method further comprises receiving selection from the at least one controller for selecting the BEIM to work with, receiving at least one work command regarding the BEIM selected, monitoring a progress of the work regarding the work command received, and selectably carrying out the work command received or interrupting the work command received, and wherein the at least one controller is operable both attached and detached.

According to an embodiment of the method for controlling an earthmoving machine, the method comprises controlling the earthmoving machine with BEIM (Built Environment Information Model)-based control system comprising at least one controller for controlling movements of an earthmoving tool attached to the earthmoving machine, at least one control unit, sensing means for providing the control unit with position data of the tool and a carrier of the earthmoving machine, and at least one displaying means for displaying at least one BEIM selectable by the at least one controller, and wherein the method further comprises receiving selection from the at least one controller for selecting the BEIM to work with, receiving at least one work command regarding the BEIM selected, monitoring a progress of the work regarding the work command received, and selectably carrying out the work command received or interrupting the work command received, and wherein the at least one controller is operable both attached and detached, and the control system further comprises means for determining the location of the at least one controller with respect to the earthmoving machine.

According to an embodiment of a computer program product, the computer program product comprises executable code that when executed, cause execution of functions according to any one of claims 1 to 14 and 17.

According to an embodiment of a computer program embodied on a non-transitory computer readable storage medium, the computer program being configured to control a processor to execute functions according any one of claims 1 to 14 and 17.

The above-disclosed embodiments may be combined to form suitable solutions provided with necessary features disclosed.

BRIEF DESCRIPTION OF THE DRAWINGS

Some embodiments are described in more detail in the accompanying drawings, in which.

For the sake of clarity, the figures show some embodiments of the disclosed solution in a simplified manner. In the figures, like reference numerals identify like elements.

DETAILED DESCRIPTION

Figure 1:
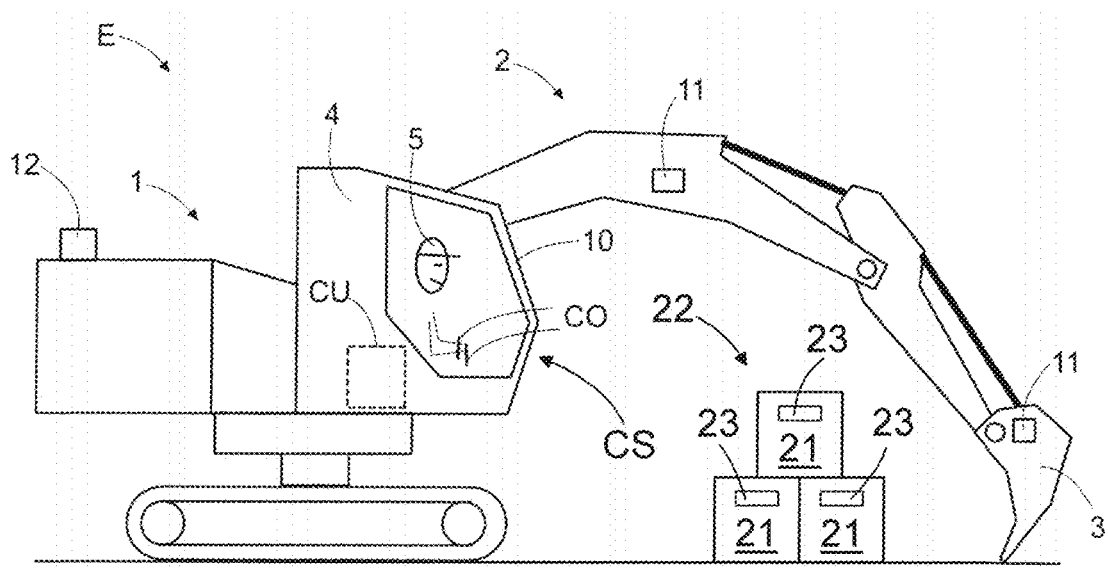
FIG. 1 is a schematic side view of an excavating machine provided with two controllers.

FIG. 1 shows an earthmoving machine E, which is in this case an excavator comprising a movable carrier 1 on which a boom 2 is arranged. At a distal end of the boom 2 is a tool 3, in this case a bucket. The boom 2 may be moved in a versatile manner. The operator 5 may select the manner how the boom 2 and the bucket responds to the controls of the controllers CO. The user may prefer in some cases automatic or semiautomatic controlling, where the bucket moves in a preconfigured or preprogrammed manner according to given controls and in the other cases the user may prefer more traditional way, for example, by controlling the bucket such that each joint in the boom 2 and the bucket are controlled separately. The earthmoving machine comprises actuating means for moving the earthmoving tool in relation to the carrier 1. These actuating means may comprise for example different kind of electrical, mechanical and hydraulic arrangements, possibly including for example different kinds of pumps, actuating cylinders or control valves, and other kind of means generally known for a person skilled in the art for realizing slewing, rotating, tilting, zooming and other similar movements of the tool 3 and the machine E.

On the carrier 1 is a control cabin 4 for an operator 5. Inside the cabin 4 is a displaying means, which comprises, for example, at least one transparent display unit 6 through which the operator 5 may monitor operation of the tool 3 and display controls selectable and controllable. The display unit 6 may also be some other kind. Additionally, the displaying means, part of the displaying means or the display unit 6 may be wireless or detachable like the controllers CO.

FIG. 1 further discloses that the earthmoving machine E and its operational components may be equipped with sensors 11 and measuring devices for gathering position data and sense the surroundings and the location of the controllers CO, for example. Moreover, the earthmoving machine E may comprise one or more navigation or position determining systems 12, such as a global navigation satellite system (GNSS), for determining position and direction of the earthmoving machine E.

According to an embodiment, skill level, user account or both may at least one of force, entitle, deny and limit the usage of at least some controls, features or both.

According to an embodiment, an experienced operator 5 desires to use four controllers CO, one for both hands and one for both feet, and the semiautomatic controls where the operator 5 may control the bucket, for example, to go let, right, forward, backward, up and down. The operator 5 may also select at which degree with respect to horizontal or vertical plane the bucket goes to these directions. The controllers CO used by feet he desires to drive the earthmoving machine E. The other foot may control the speed and whether to go forward or backward and the other foot may control whether to go straight or to turn left or right, for example. When driving the earthmoving machine, the controlling of the bucket, i.e. the tool, may include at least one of controlling the tool as such, like a position or alignment of the tool, and controlling the moving of the earthmoving tool in relation to the carrier.

The user may select from various alternatives which kind of feedback signals he or she desires at each situation in each earthmoving machine E. Selectable feedback signals are at least: graphical, augmented reality, virtual reality, audiovisual, visual illumination, haptics and force-feedback.

Automatic or semiautomatic controls, as well as any other data relating to the earthmoving machine E, may be preprogrammed into the control unit CU. New automatic and semiautomatic controls may be programmed by the operator 5 or the operator 5 may download preprogrammed or preconfigured automatic or semiautomatic controls, for example as a data packet, from a cloud service where the earthmoving machine E or the user has access to. The user may, for example, log into his or her user account or identify himself or herself using any known method into the earthmoving machine E or into the cloud service or the user may log or identify the earthmoving machine E into the cloud service and select the data packets he or she desires and has access to and download them. Data packets may be downloaded in every other known way, as well. Preferably, a user with administrator privileges may download the data packets the operator 5 requested.

For example, for unexperienced operator 5 it might be preferable to limit the maximum speed of the driving in work site as well as the motion controls of the earthmoving machine E. Preferably, controls may have some other limitations or prerequisites to function such as whether the controllers CO are attached or detached, and whether detached, regarding the location of the controllers CO. For example, if the controllers CO are too far, the control system CS may disable the controllers CO and if the controllers CO are too near, the control system CS may slow down the motions.

Preferably, the control system CS may be set to detect automatically or manually, in addition to the location of the operator 5, the direction or orientation of the operator 5 with respect to the direction or orientation and location of the earthmoving machine E, the boom 2 or the tool 3 and change the controls with respect to these directions or orientations. For example, when the operator 5 is outside the cabin facing the earthmoving machine E and the boom 2, controlling the tool 3 to go left as seen by the operator 5, the tool 3 may go left as seen by the side of the operator 5 and to right as seen by the side of the earthmoving machine E.

Figure 2:
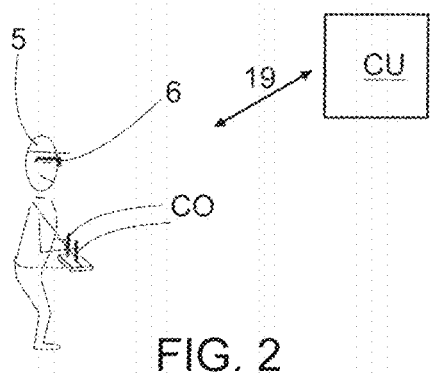
FIG. 2 is a schematic view of an operator operating an earthmoving machine outside the cabin.

FIG. 2 discloses an operator 5 controlling an earthmoving machine E from outside the cabin 4. The operator 5 has a vest where the controllers CO are attached and a headset 18 provided with one or two head-mounted display units 6 depicted in FIG. 5. The head-mounted display with the controllers CO enables the operator 5 to operate the control system CS outside the cabin 4 like using the control system CS inside the cabin 4. Both the controllers CO and the headset 18 communicate with one or more control units CU through one or more communication channel 19. The headset 18 may be used inside the cabin 4, as well. When using the headset 18 inside the cabin 4, the displaying means in the cabin 4 may be switched off if desired.

According to an embodiment, an operator selects to use only two controllers CO for controlling the operations of the earthmoving machine E. In the embodiment, the operator 5 is well experienced to use them so the operator 5 may detach the controllers CO and step outside the cabin 4 and continue, for example, after 5 second delay or one meter away from the earthmoving machine E, controlling the earthmoving machine E outside the cabin 4 with otherwise full control, but, when driving the earthmoving machine E outside the cabin 4, the maximum speed is limited to 0.5 km/h, for example.

According to an embodiment, the control system CS comprises two controllers CO.

According to an embodiment, an operator 5 has another set of controllers CO that the operator 5 uses when operating with detached controllers CO. Thus, the operator 5 need not to detach those controllers CO that are attached in the cabin 4.

According to an embodiment, the sets of controllers CO each have a selector, for example a switch or a button or the like, to select whether the set of controllers CO is operating or not operating. If more than one set of controllers CO is at the same time set to "operating" the certain earthmoving machine E, the closest set to the earthmoving machine overrides the other sets. This means that if attached set of controllers CO is set to "operating", it overrides the others and if the attached set is set to "not operating", the control system CS of the earthmoving machine E determines which of the controllers CO set to "operating" is the closest to the earthmoving machine E and lets the closest to operate and disables the others. If there is two sets equidistant to the earthmoving machine E set to "operating", the control system CS may disable one or both and somehow signal that too more sets of controllers CO is set to "operating" mode.

According to an embodiment, the set of controllers CO operating the earthmoving machine E may operate the earthmoving machine E over the Internet or other suitable connection such that the operator 5 need not be within sight to the earthmoving machine E. These solutions may be suitable for mining purposes, for example. Thus, the operator 5 may operate the earthmoving machine E from outside the mine, for example. According to the embodiment, the operator 5 may have an additional visual connection (not shown) to the tool 3, surroundings of the earthmoving machine E or both via one or more video cameras (not shown) attached at suitable places in the earthmoving machine E such as carrier 1, cabin 4, boom 2 or tool 3.

The level of experience, or the skill level, may be set to the control system CS manually by, for example, the operator 5 or the user with administrator privileges. The skill level may be set also by the control system CS itself, for example, by analyzing all the time the selections and controls given by the operator 5 or by retrieving the history data gathered from the operator 5, meaning the user logged in, regarding the selections and controls given by the user or both. History data may have been gathered both from the earthmoving machine E, from similar earthmoving machine, from any other earthmoving machine, from any other similar machine and a simulator simulating some or any of the previously mentioned.

Analyzing selections and controls may contain, for example, data about how fast the user makes selections in between different menu items or jumps from one menu to the other or how quick or smooth the controls are in controlling, for example, driving system, peripheral devices, maintenance system, road navigation system, work site navigation system, positioning the earthmoving tool 3 with respect to the work site, weighing system, automation system, measuring system and process control.

According to an embodiment, the skill level may be different regarding what is been controlled, such that one operator, or user, may have high skill level in controlling the tool 3 and the other may have high skill level in using the driving system and so on.

The data regarding each user, or operator, may contain information of each user's experience regarding various earthmoving machines E and may be at least one of gathered, uploaded and downloaded by the earthmoving machine E, uploaded and downloaded by the user and the operator and uploaded and downloaded by the user with administrator privileges. Here uploading means transmitting the gathered data from the control system CS to the cloud service or identity card or the like and downloading means retrieving the history data or skill level data from the cloud service or identity card or the like to the control system CS. Each earthmoving machine E may monitor the usage of the controllers CO in each situation, analyze it, gather it and upload it. The user with administrator privileges or the user himself or herself may insert the data according to his knowledge of the user's experience regarding to each kind of earthmoving machine E, for example, according to a test or an examination performed or passed.

The limitation, for example, to the maximum speed may be set by the supervisor of the work site, by the operator 5 himself or by the control system CS that has the data of the controlling hours outside the cabin operated by the operator 5. When controlling the earthmoving machine E outside the cabin 4, the head-mounted display units 6 or the like or any other display unit 6 is not mandatory. Using the controllers CO without seeing any display unit 6 does not necessarily restrict the current use of the earthmoving machine E, if the user remembers the selections needed without seeing them on any display.

According to an embodiment, when the sensors sensing the surroundings of the tool 3 detect that the operator is in only one meter distance from the tool 3, the control system CS restricts the motion speeds of the earthmoving machine E, the boom 2 and the tool 3 to, for example, 20% of the motion speeds set in unrestricted conditions to the operator 5.

Figure 3:
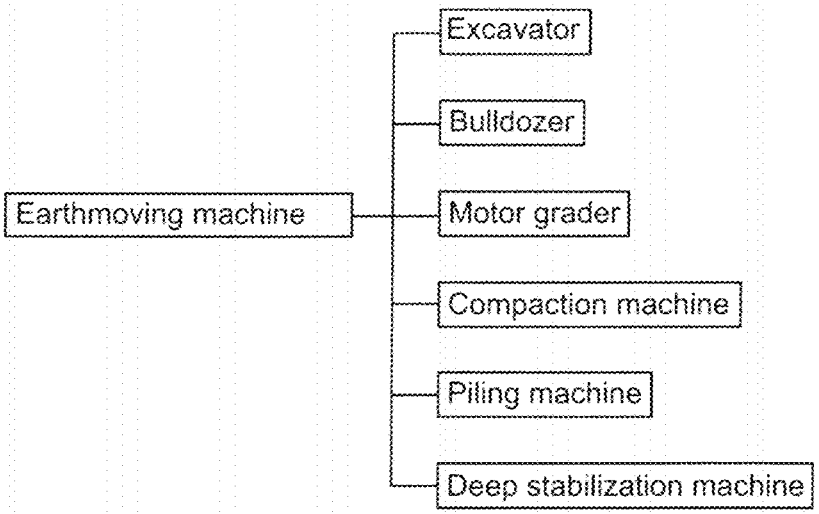
FIG. 3 is a schematic diagram showing some feasible earthmoving machines.

FIG. 3 show feasible earthmoving machines. Regarding the earthmoving machine and the habits of the user, the number of the controllers CO may vary. Optimal amount of controllers CO in excavator is two. Also the amount of the controllers CO may be one, three or four. If the amount is three or four, one or two of them may be usable by feet, for example. Not all the controllers CO need be detachable. If only part of the controllers CO were detached, the operation mode of each controller CO may change, since the controllers CO not detached may be disabled and the features of the disabled controllers CO may be added to the controllers CO detached. Preferably the control system CS requests user action whether to change the operation mode or not.

Figure 4A:
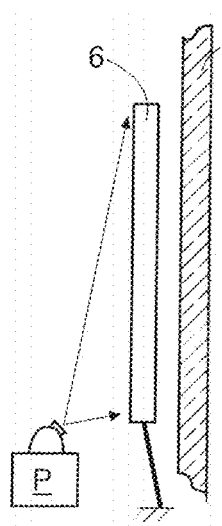
FIGS. 4a-4c are schematic side views of some possible arrangements for displaying earthmoving images on a transparent display unit.
Figure 4B:
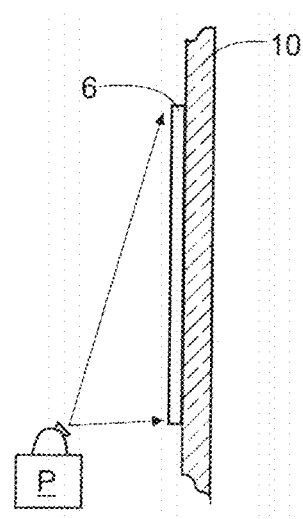
Figure 4C:
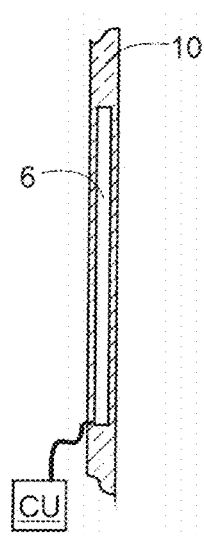

FIG. 4a discloses a separate transparent display unit 6 or combiner arranged at a distance from a windscreen 10. FIG. 4b discloses a solution wherein a combiner 6 is fastened to an inner surface of the windscreen 10. FIG. 4c discloses an integrated solution wherein the transparent display unit 6 is located inside a structure of the windscreen 10.

Figure 5:
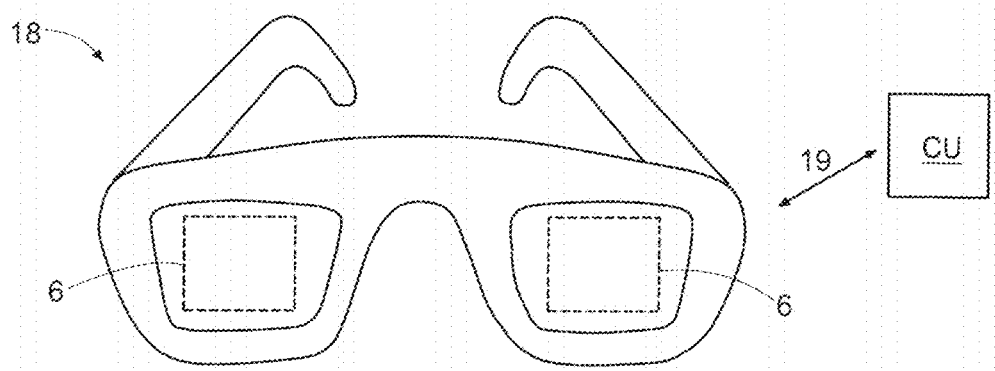
FIG. 5 is a schematic front view of a headset provided with one or two head-mounted display units.
Figure 6:
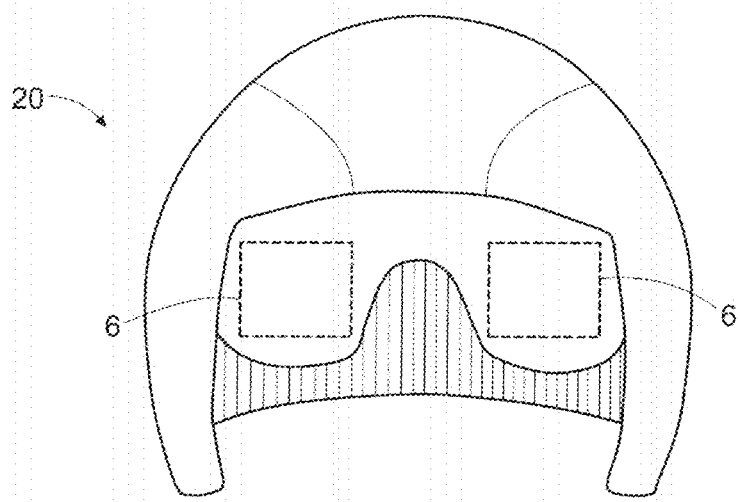
FIG. 6 is a schematic front view of a helmet provided with a head-mounted display unit, and FIG. 7 discloses schematically a structure of an earthmoving operating system for a control system.

FIG. 5 discloses a headset 18 or media glasses provided with one or more transparent display units 6. The headset 18 may communicate with one or more external or internal control units CU through one or more data communication 19. The same applies also for a helmet 20, depicted in FIG. 6, which is also provided with the transparent display units 6. In both arrangements the earthmoving images and data elements may be displayed so that they appear to locate at a visual distance from the transparent display units 6, which are located close to eyes of the operator.

The automatic and semiautomatic controls of the earthmoving machine E may also be based on a Built Environment Information Model (BEIM), called later BEIM. The BEIM is an information model including an intended planned final result of an earthwork to be completed, a single earthwork forming either a complete earthmoving operation to be carried out or a part of the complete earthmoving operation to be carried out. The BEIM also includes specific operations to be carried out by the earthmoving machine E so as to achieve the planned final result of the earthwork to be carried out.

The one or more BEIMs are stored in an earthmoving operating system EOS that forms a master plan for a complete earthwork operation and includes one or more BEIMs. The earthmoving operating system EOS or one or more specific BEIMs forming at least part of the earthmoving operating system EOS and intended to be carried out next may be available for example in a cloud service or Internet, whereby the earthmoving operating system EOS or the one or more BEIMs may be downloaded into the at least one control unit CU of the earthmoving machine E for starting the one or more earthworks. Necessary working phases and tasks are then carried out either automatically or semi-automatically by the earthmoving machine E and the operator 5 thereof so that one or more earthworks forming the one or more BEIMs are completed.

There are a number of different earthmoving information models which may form or which may be utilized to form the BEIM for a specific earthwork. These include for example Geospatial Information System (GIS), Building Information Modelling (BIM), Infrastructure Building Information Modelling (I-BIM), Civil Information Model (CIM) and SmartCity Platforms. The models may be two-dimensional models, three-dimensional models or Triangulated Irregular Network (TIN)-models, wherein plane surfaces are defined by a number of triangles. The earthmoving information modelling system comprises a classification system that defines meaning and properties of different kind of infrastructures and -models and different substructures thereof, such as different layers of foundations structures, filling layers, surface layers etc. for example for road construction purposes.

Figure 7:
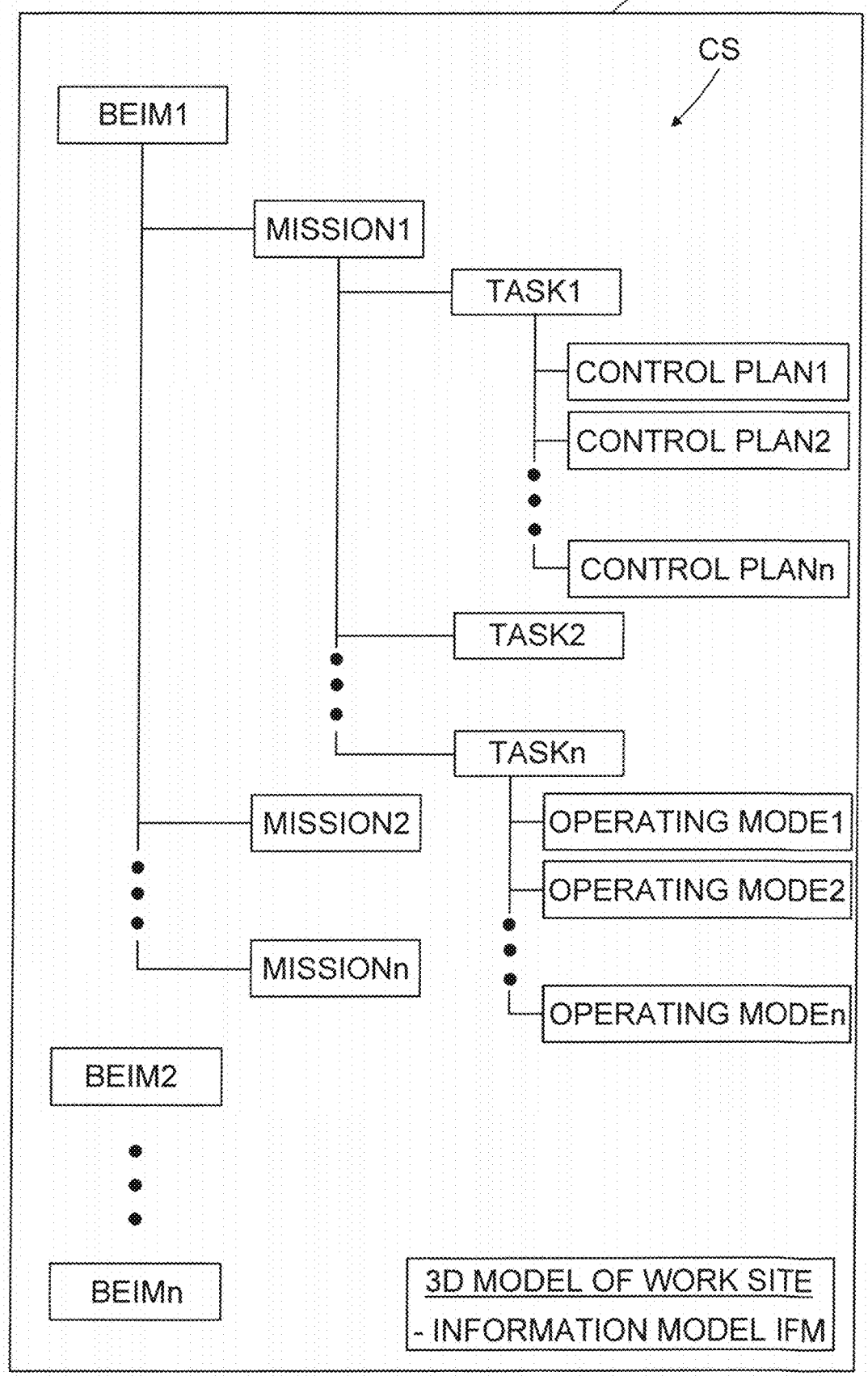

FIG. 7 discloses schematically a structure of an earthmoving operating system EOS to be set for an earthmoving operation. According to an example the earthmoving operation may comprise all earthworks relating to a building of a shopping centre. The earthmoving operating system EOS comprises one or more BEIMs, each BEIM corresponding a specific earthwork that forms part of the complete earthmoving operation. After a number of the earthworks corresponding to the same number of the BEIMs have been carried out, the whole earthmoving operation has been completed. The earthmoving operating system EOS thus contains one or more BEIMs, and the number of the BEIMs in one earthmoving operating system EOS is in practice limited by an extent of the complete earthmoving operation and an appropriate division of the whole earthmoving operation to a number of separate earthworks, each single earthwork thus determining a single BEIM. In FIG. 7 the number of the BEIMs is n, the earthmoving operating system EOS of FIG. 7 thus comprising BEIM1, BEIM2, . . . , BEIMn, i.e. n pieces of separate earthworks that together determine the whole earthmoving operation which, in turn, determines the earthmoving operating system EOS for carrying out the whole earthmoving operation.

Each BEIM comprises or determines a number of, i.e. one or more, missions, e.g. MISSION1, MISSION2, . . . , MISSIONn. After each and every mission have been carried out the respective BEIM has been completed. Referring to the example of the building of the shopping centre mentioned above, a single BEIM, such as BEIM1, could for example determine a building information model for building a parking area for the shopping centre. In that case the BEIM1 could be partitioned for example into three missions. The first mission, such as MISSION1, could determine an operating model for excavating an excavation to a predetermined depth at the area reserved for the parking area. The second mission, such as MISSION2, could determine a filling of the excavation to a predetermined height with a crushed rock. The last mission, such as MISSION3, could determine a surfacing of the parking area.

The mission may be determined by the classification system that determines the meanings and properties of different infrastructures and -models and possible substructures thereof. Actual work commands for the operation of the earthmoving machine E for carrying out the mission may be set on the basis of the classification system. The information model comprising the classification system thus enables an automatic or semiautomatic work of the earthmoving machine E. Each mission comprises or determines an operating model for the movements of the earthmoving machine E and/or for the movements of the tool 3 of the earthmoving machine E that provide, after they have been carried out, the mission being completed.

Each mission may be divided into a number of, i.e. one or more, tasks, whereby each task comprises a number of, i.e. one or more, movements of the earthmoving machine E and/or a number of, i.e. one or more, movements of the tool 3 of the earthmoving machine E which together, after they have been carried out, provide the specific task being completed. Each task may thus comprise one or more movements of the earthmoving machine E, one or more movements of the tool 3 of the earthmoving machine E, or one or more movements of both the earthmoving machine E and the tool 3 of the earthmoving machine E.

The movement of the earthmoving machine E may comprise moving the carrier 1 of the earthmoving machine E to another position at a worksite. The movement of the tool 3 may comprise moving the tool 3 to carry out the specific task, such as to provide one or more consecutive excavating actions by a bucket of an excavator for removing ground from the excavation, or one or more individual flattening actions by the bucket of the excavator for flattening the point already excavated. The movement of the tool 3 of the earthmoving machine E may thus also comprise a movement of a part of the earthmoving machine E, such as a boom 2 of the excavator, to which the tool 3 of the earthmoving machine E, such as the bucket, is connected to. If it is compulsory to move also the carrier 1 of the earthmoving machine E for carrying out the necessary movements of the tool 3 of the earthmoving machine E, the carrier 1 of the earthmoving machine E may be moved between the consecutive actions of the tool 3 of the earthmoving machine E or alternatively during the one or more consecutive actions of the tool 3 of the earthmoving machine E.

Referring to the example of the building of the shopping centre mentioned above and FIG. 7, TASK1 could for example comprise one or more consecutive digging actions by the bucket of the excavator, TASK2 could for example comprise one or more consecutive flattening cycles by the bucket of the excavator and TASKn could for example comprise moving the earthmoving machine E to another position at the worksite.

Each task, in turn, may be divided into a number of, i.e. one or more, control plans, wherein each control plan comprises a number of, i.e. one or more, specific controls for moving the tool 3 of the earthmoving machine E and/or for moving the earthmoving machine E or a part thereof in a specific way necessary to complete the specific task. The control of the tool 3 of the earthmoving machine E may for example comprise specific controls for operating different actuators so as to complete the specific task. Referring to the example of the building of the shopping centre mentioned above and FIG. 7, CONTROL PLAN1 may for example comprise a control for operating a cylinder intended to control a position of the bucket of the excavator. CONTROL PLAN2 may for example comprise a control for operating a cylinder intended to control a position of a part of the boom 2 to which the tool 3 is connected to, and CONTROL PLANn, in turn, may for example comprise a control for turning the control cabin 5 and the boom 2 relative to the carrier 1.

When the BEIM-based control system CS for controlling an earthmoving machine E is implemented in an earthmoving machine E, the BEIM-based control system CS is configured to comprise a number of hardware means forming at least a part of means used to control operations of the earthmoving machine E as well as a number of software means comprising executable code that, when executed, cause the execution of the operations of the earthmoving machine.

The BEIM-based control system comprises at least one controller CO for controlling the movements of the earthmoving tool 3 attached to the earthmoving machine E.

Furthermore the BEIM-based control system comprises at least one control unit CU to be arranged to the earthmoving machine E. The control unit CU may for example be used to download and store the one of more BEIMs or the earthmoving operating system EOS comprising the one or more BEIMs for example from the cloud service or Internet.

Furthermore the BEIM-based control system comprises sensing means for providing the control unit CU with position data of the carrier 1 and the tool 3 of the earthmoving machine E. The position data may be acquired in ways disclosed above.

Furthermore the BEIM-based control system further comprises at least one displaying means, such as the display unit 6, for displaying at least one BEIM selectable by the at least one controller CO.

Furthermore, the at least one control unit CU is configured to receive selection from the at least one controller CO for selecting the BEIM to work with. The operator 5 may use at least one controller CO to select the BEIM to work with from a group of BEIMs selectable. Alternatively, the selection information may be received from at least one control unit CU executing an automatic control of the earthmoving machine E.

Furthermore, the at least one control unit CU is configured to receive at least one work command regarding the BEIM selected. The work command may for example be a command starting an execution of at least one mission or at least one task relating to at least one mission. The said work command may be initiated by the operator 5 or by at least one control unit CU executing the automatic control of the earthmoving machine E.

Furthermore, the at least one control unit CU is configured to monitor a progress of the work regarding the work command received, and selectably, either to carry out the work command received or interrupt by the at least one control unit CU the work command received. If the earthmoving machine E is capable to carry out the work corresponding the work command received, the at least one control unit CU allows the earthmoving machine E, either independently or as controlled by the operator 5, to carry out the specific work. Alternatively, if the at least one control unit CU recognizes, for example because of obstructions in the surroundings of the earthmoving machine E detected by sensing means 11, 12, or for example because of the location or position of the earthmoving machine E at the worksite, that the one or more actions defined by the work commands cannot be carried out, the execution of the work command received is interrupted by the control unit CU.

Furthermore the at least one controller CO is operable both attached and detached. The at least one controller CO may thus be located in the control cabin 4 of the earthmoving machine E and be physically connected to the earthmoving machine E. Alternatively, the at least one controller CO may for example be carried by the operator 5 of the earthmoving machine E in the vicinity of the earthmoving machine E. Furthermore, according to an embodiment, the at least one controller CO may be located in a control room remote from the earthmoving machine E.

Furthermore, the control system comprises means for determining the location of the at least one controller CO with respect to the earthmoving machine E, such as sensing means 11, 12 or other measuring devices arranged in the earthmoving machine E for gathering position data and sense the surroundings and the location of the controllers CO.

If all the controllers CO for the earthmoving machine E are electronically controllable controllers, the earthmoving machine E may be arranged to be completely automatically operating earthmoving machine E. Alternatively, if desired, some or all actions of earthmoving machine E may be determined to be controlled by the operator 5. Hence, any level of operator involvement may be determined for the operation of the earthmoving machine E.

In an embodiment of a semi-automatic control of the earthmoving machine specific actions of the earthmoving machine, such as digging or levelling, may be controlled on the basis of the selectable operating modes. In the operating mode based control each operating mode corresponds to a specific action to be provided by the earthmoving machine, such as the digging or levelling. In other words, the digging may provide one type of the operating mode and the levelling may provide another type of the operating mode. The operating mode may comprise the movements of the earthmoving tool 3 of the earthmoving machine E necessary to carry out the action corresponding to the selected operating mode. When the earthmoving machine E is controlled by the operation mode based control system, the earthmoving tool 3 is to be positioned, as controlled by the operator 5 using the at least one controller CO, at a starting point of a work intended to be carried out, and thereafter the specific operating mode is selected by the at least one controller CO and the respective action is carried out automatically as controlled by the at least one control unit CU.

In an embodiment, an earthmoving machine E may be run in "learning by demonstration" operation mode. In learning by demonstration operating mode, for example, unloading a bucket may be demonstrated to the earthmoving machine E by the operator 5, meaning that it is shown to the control system CS where to unload contents of the bucket by indicating the end position to the earthmoving machine E, for example, and when the "learning by demonstration" mode is taught and activated, the bucket 3 is positioned by the control system CS according to demonstrated end position and also unloaded by the control system CS if desired by the operator 5. In order to follow demonstrated path by the bucket 3, the system may have to involve rotation and tilt capabilities of the bucket 3 in such a way that the content of the bucket 3 will not be unloaded before the end position.

Another example of "learning by demonstration" may be that a property protection is taught to the earthmoving machine E by virtual boundaries set by the operator 5. Thus, the earthmoving machine E is able to avoid damaging surrounding property inside the protection boundaries.

In yet another example of "learning by demonstration", a restore preset tool position and orientation are taught to the control system CS. Thus, the operator 5 may command the control system CS to store any tool 3 position, rotation and/or tilt and after using the tool 3, the operator 5 may restore stored position by a single command.

When run in learning by demonstration mode, all the features regarding optimizing are usable. For example, when "smooth moves" is one of the selected performance parameters to be optimized and property protection is taught to the earthmoving machine E, any movement of the earthmoving machine E does not stop instantly if a set virtual border be reached but starts slowing down earlier than when the border would be reached. Slowing down regards at least the one or more movements taking the tool 3 or some other part of the earthmoving machine E towards the set virtual border when the tool 3 or some other part of the earthmoving machine E is approaching too close to the set virtual border and eventually stops at least the at least one movement taking the tool towards the virtual border if the set virtual border be reached. According to an embodiment the operating mode based control system may be utilized in the BEIM-based control system for example in carrying out of a specific task. In this embodiment a specific task may compose of a number of consecutive actions corresponding to the selectable operating modes. This has been disclosed schematically in FIG. 7, wherein the task TASKn is schematically disclosed to be composed of n consecutively selected operating modes, i.e. OPERATING MODE1, OPERATING MODE2, . . . , OPERATING MODEn, wherein each operating mode OPERATING MODE1, OPERATING MODE2, . . . , OPERATING MODEn may for example correspond to either the digging or levelling.

The operating mode based control system for controlling the earthmoving machine E comprises at least one controller CO for controlling at least one movement of the earthmoving tool 3 attached to the earthmoving machine E, at least one control unit CU and at least one displaying means for displaying operating modes selectable by the at least one controller CO. The at least one control unit CU is configured to receive at least one selection from the at least one controller CO for selecting the operating mode, monitor the at least one movement of the earthmoving machine E regarding the operating mode selected, and based in at least part on monitoring carry out the at least one movement of the earthmoving tool 3, or interrupt by the at least one control unit CU the at least one movement of the earthmoving tool 3. Furthermore the at least one controller CU is operable both attached and detached.

According to an embodiment of the operating mode based control system, the control system further comprises means for determining the location of the at least one controller CO with respect to the earthmoving machine E.

According to an embodiment of the operating mode based control system, the at least one control unit CU is further configured to indicate a performance of the at least one movement of the earthmoving tool 3, compare the indicated performance to at least one performance parameter threshold, suggest optimization of the at least one movement of the earthmoving tool 3 not fulfilling the at least one performance parameter threshold, and optimize the at least one movement of the earthmoving tool 3 not fulfilling the at least one performance parameter threshold. According to this embodiment a performance of the at least one movement of the earthmoving tool 3 is monitored relative to the at least one performance parameter threshold and an optimized way to carry out the movement in view of the monitored performance parameter may be suggested by the at least one control unit CU. The performance parameter may present for example a time used to carry out the movement, an energy consumption used to carry out the movement, stresses being directed to the earthmoving tool 3 or the earthmoving machine E during the movement, smoothness of moves while transferring load with the tool 3 or moving an empty tool 3 or some combination thereof. The smoothness of moves may be measured, for example, based on amount of load, such as crushed rock, fallen while transferring each load and/or based on sensors 11, 12 and/or other sensing means sensing oscillations of the earthmoving machine E while moving the tool 3 either loaded or empty.

According to an embodiment of the operating mode based control system, the at least one control unit is configured to indicate a performance of the at least one movement of the earthmoving tool, compare the indicated performance to at least one performance parameter threshold, and optimize the at least one movement of the earthmoving tool.

According to an embodiment of the operating mode based control system, the at least one control unit is configured to indicate a performance of the at least one movement of the earthmoving tool, compare the indicated performance to at least one performance parameter threshold, optimize the at least one movement of the earthmoving tool, and indicate the optimization performed.

According to an embodiment of the operating mode based control system, the at least one control unit CU is further configured to store a priority level to be used to each performance parameter to be optimized. The priority level to each performance parameter may vary regarding each movement, part of task or task. For example, while moving an empty tool 3, time used and/or energy consumption used may be on the highest priorities and while transferring load with the tool 3, energy consumption and/or smoothness of moves may be on the highest priorities. Different kind of loads may also have differing priorities, as well as, working in tasks or part of tasks where safety limits to property or obstacles, for example, are smaller. Thus, the surroundings may also effect on priorities regarding moving empty tool 3, as well.

According to an embodiment of the operating mode based control system the at least one control unit CU is further configured to store at least one movement of the earthmoving tool 3 as demonstrated by the operator 5 using at least one controller CO, optimize the stored at least one movement of the earthmoving tool 3, and store the at least one optimized movement. According to this embodiment the operator 5 first demonstrates the movement in question and thereafter the control unit CU repeats the same movement a number of times and at the same time optimizes the movement if necessary. After the possible optimization the demonstrated movement is stored to a memory accessible by the control unit CU.

According to an embodiment of the operating mode based control system the at least one control unit CU is configured to continue the interrupted movement of the earthmoving tool 3 regarding the operating mode selected in response to a command to continue the interrupted movement received from the at least one controller CO and/or in response to detecting, by at least part, the sensing means 11, 12 that the cause of the interruption disappeared. According to this embodiment the possibly interrupted movement of the earthmoving tool 3 is continued in response to a corresponding command received from the at least one controller CO. The command may be initiated by the operator 5, for example. Alternatively the command may be initiated by the at least one control unit CU after the reason for interrupting of the movement of the earthmoving tool 3 has ceased in response to the sensing means 11, 12 detecting that the cause of the interruption has disappeared.

According to an embodiment of the operating mode based control system the at least one control unit CU is configured to interrupt the movement of the earthmoving machine E and/or the movement of the earthmoving tool 3 in response to an unidentified object entering to a work area of the earthmoving tool 3 and/or a work area of the earthmoving machine E. The unidentified object entering to the work area of the earthmoving tool 3 and/or the earthmoving machine E may be a person not being the operator 5 of the earthmoving machine E or any other machine or object sensed by the sensing means 11, 12 not being allowed to enter to the work area of the earthmoving machine E.

According to an embodiment of the operating mode based control system the at least one control unit CU is configured to set for the at least one movement of the earthmoving machine E and/or the earthmoving tool 3 at least one virtual boundary line and interrupting by the at least one control unit CU the at least one movement causing the reaching of the at least one virtual boundary line. The virtual boundary line may be set by the information provided by the control unit CU and/or the sensing means 11, 12 inspecting the surroundings of the earthmoving machine E and/or the surroundings of the earthmoving tool 3, or alternatively by the operator 5 through the at least one controller CO.

According to an embodiment of the operating mode based control system the at least one control unit CU is configured to limit a speed of the movement of the earthmoving machine E and/or the earthmoving tool 3 in response to a person or some other object remaining in the work area of the earthmoving machine E and/or the earthmoving tool 3. Alternatively the at least one control unit CU may be configured to completely stop the movement of the earthmoving machine E and/or the earthmoving tool 3 in response to a person or some other object entering into the work area of the earthmoving machine E and/or the earthmoving tool 3.

According to an embodiment of the operating mode based control system the control unit CU is configured to monitor a load and/or stress of the earthmoving tool and/or the earthmoving machine (E) and change the operating mode when the load and/or the stress exceeding a predetermined threshold parameter.

According to an embodiment of the operating mode based control system the at least one control unit CU is configured to either to limit a speed of the movement of the earthmoving machine E and/or the earthmoving tool 3 or to completely stop the movement of the earthmoving machine E and/or the earthmoving tool 3, i.e. to interrupt the work command, in response to a load of the earthmoving tool 3 or stresses being directed to the earthmoving tool 3 and/or the earthmoving machine E exceeding a respective predetermined threshold parameter.

The control system CS may also comprise detecting means being configured to detect an object to be selected from a group of objects intended to be handled by the machine E and/or the tool 3 thereof. According to an embodiment the group of object may comprise a selection of different type of objects with regards for example to size or intended purpose of use of the objects. According to another embodiment the group of objects may comprise a number of similar objects with similar characteristics without any significant differences between individual objects. According to a further embodiment the group of objects may comprise similar kinds of objects but at least some of them being specifically individualized for example on the basis of specific accessories installed or to be installed to the object or on the basis of the intended location where the object is intended to be finally located at the work site. FIG. 1 discloses schematically a group 22 of objects 21.

This object detection and selection may be based for example on shape and/or size recognition of the objects or in view of specific object identifiers 23 attached to the objects and the corresponding object data input to an information model IFM possibly forming part of a work site 3D model. The object identifiers 23 may be based on RDIF, barcode or near-field-communication (NFC) technology, or any other technology carrying out the same purpose than the previously mentioned or any combination of these technologies. The information model may also comprise information about a storage place of the objects at the work site and a placement where the objects are intended to be finally located to for their actual purpose of use at the work site. The control system CS may be configured to determine, on the basis of the data in the information model, the object to be needed next and either to control the machine E or to assist the operator 5 to collect the object from the storage place and to haul and possibly install it to the position where the object is intended to be used at the finished work site.

According to an embodiment of the control system CS, the control system thus comprises an information model IFM comprising information of at least one of shape, size and at least one individual object identifier of at least one object and at least one of a storage place of the object and an installation position and/or orientation of the object at the work site.

It will be obvious to a person skilled in the art that, as the technology advances, the inventive concept can be implemented in various ways. The invention and its embodiments are not limited to the examples described above but may vary within the scope of the claims.

What is claimed is:

1. A BEIM-based control system for controlling an earthmoving machine, the earthmoving machine comprising at least one controller for controlling at least one movement of an earthmoving tool attached to the earthmoving machine, the BEIM-based control system comprising:
    at least one controller for controlling at least one movement of an earthmoving tool attached to the earthmoving machine;
    at least one control unit;
    a sensor for providing the control unit with position data of the earthmoving tool and a carrier of the earthmoving machine with respect to the BEIM; and at least one displaying means for displaying at least one BEIM selectable by the at least one controller, wherein the at least one control unit is configured to perform operations comprising:
  receiving at least one selection from the at least one controller for selecting the BEIM to work with;
  receiving at least one work command regarding the BEIM selected;
  monitoring a progress of the work regarding the work command received; and
  based at least in part on the monitoring, carrying out the work command received, or interrupting, by the at least one control unit, the work command received, the at least one controller being operable both attached and detached, the BEIM comprising an earthmoving information model based on at least one of Geospatial Information System, Building Information Modelling, Infrastructure Building Information Modelling, Civil Information Model and SmartCity Platform.

2. The control system as claimed in claim 1, wherein the BEIM comprises an earthmoving information model based on Building Information Modelling.

3. The control system as claimed in claim 1, wherein the BEIM comprises a number of missions, each mission comprising a number of tasks, at least one of the number of missions and the at least one of the number of tasks comprising at least one work command to be carried out by the earthmoving machine.

4. The control system as claimed in claim 1, wherein the control unit is configured to retrieve the at least one BEIM from a cloud service or Internet.

5. The control system as claimed in claim 1, wherein the control unit is configured to perform operations comprising:
  monitoring at least one of: load and stress of at least one of: the earthmoving tool and the earthmoving machine; and
  interrupting the work command when the at least one of: the load and stress exceeding a predetermined threshold parameter.

6. The control system as claimed in claim 1, wherein the control system further comprises means for determining the location of the at least one controller with respect to the earthmoving machine, and the operation mode of the at least one controller depends on the location of the at least one controller.

7. The control system as claimed in claim 1, wherein the operation mode of the at least one controller depends on the distance between a detected obstacle and at least one of: the earthmoving tool and the earthmoving machine.

8. The control system as claimed in claim 1, wherein the operation mode of the at least one controller depends on the user specified adjustments made by or made for the user currently logged in to the control system, wherein the extent of the available adjustments depends on the skill level data of the user currently logged in, the skill level data being defined by at least one of: usage hours of the earthmoving machine, usage hours of the respective earthmoving machine and competence level, the competence level being at least one of: accomplished and passed by at least one of: examination and test.

9. The control system as claimed in claim 8, wherein the user with administrator privileges defines the skill level by editing the skill level data of the user in a cloud service and the earthmoving machine retrieves the data from the cloud service.

10. The control system as claimed in claim 1, wherein the at least one control unit is configured to receive selections and controls from the at least one controller for controlling all the operations of the earthmoving machine controllable by the operator of the earthmoving machine.

11. The control system as claimed in claim 1, wherein the operation mode of the at least one controller, when detached, depends on the distance between the at least one controller and the earthmoving machine.

12. The control system as claimed in claim 1, wherein the operation mode of the at least one controller, when detached, depends on the distance between the at least one controller and the earthmoving tool of the earthmoving machine.

13. The control system as claimed in claim 1, wherein the at least one control unit is configured to receive selections and controls from the at least one controller for controlling at least moving the earthmoving tool in relation to the carrier and driving the earthmoving machine.

14. The control system as claimed in claim 1, wherein the amount of controllers is two.

15. An earthmoving machine, the earthmoving machine comprising:
  a movable carrier;
  at least one earthmoving tool that is movable in relation to the carrier;
  at least one controller for controlling at least one movement of the at least one earthmoving tool attached to the earthmoving machine;
  peripheral devices;
  actuating means for moving the earthmoving tool in relation to the carrier and means for controlling the peripheral devices; and
  at least one BEIM-based control system, the BEIM-based control system comprising:
    at least one control unit;
    a sensor for providing the control unit with position data of the earthmoving tool and a carrier of the earthmoving machine with respect to the BEIM; and
    at least one displaying means for displaying at least one BEIM selectable by the at least one controller, wherein the at least one control unit is configured to perform operations comprising:
      receiving at least one selection from the at least one controller for selecting the BEIM to work with;
      receiving at least one work command regarding the BEIM selected;
      monitoring a progress of the work regarding the work command received; and
    based at least in part on the monitoring, carrying out the work command received, or interrupting, by the at least one control unit, the work command received, the at least one controller being operable both attached and detached, the BEIM comprising an earthmoving information model based on at least one of Geospatial Information System, Building Information Modelling, Infrastructure Building Information Modelling, Civil Information Model and SmartCity Platform.

16. The earthmoving machine as claimed in claim 15, wherein the earthmoving machine is one of the following: excavator, bulldozer, motor grader, compaction machine, piling machine, deep stabilization machine, surface top drilling machine.

17. A method for controlling an earthmoving machine, the earthmoving machine comprising at least one controller for controlling at least one movement of an earthmoving tool attached to the earthmoving machine, the earthmoving machine controlled with a BEIM-based control system comprising:

at least one controller for controlling movements of an earthmoving tool attached to the earthmoving machine;

at least one control unit;

a sensor for providing the control unit with position data of the tool and a carrier of the earthmoving machine; and at least one displaying means for displaying at least one BEIM selectable by the at least one controller, the method further comprising:

receiving selection from the at least one controller for selecting the BEIM to work with;

receiving at least one work command regarding the BEIM selected;

monitoring a progress of the work regarding the work command received, and selectably; and carrying out the work command received, or interrupting the work command received, wherein the at least one controller is operable both attached and detached, the BEIM comprising an earthmoving information model based on at least one of Geospatial Information System, Building Information Modelling, Infrastructure Building Information Modelling, Civil Information Model and SmartCity Platform.

\* \* \* \* \*